Figure 1:
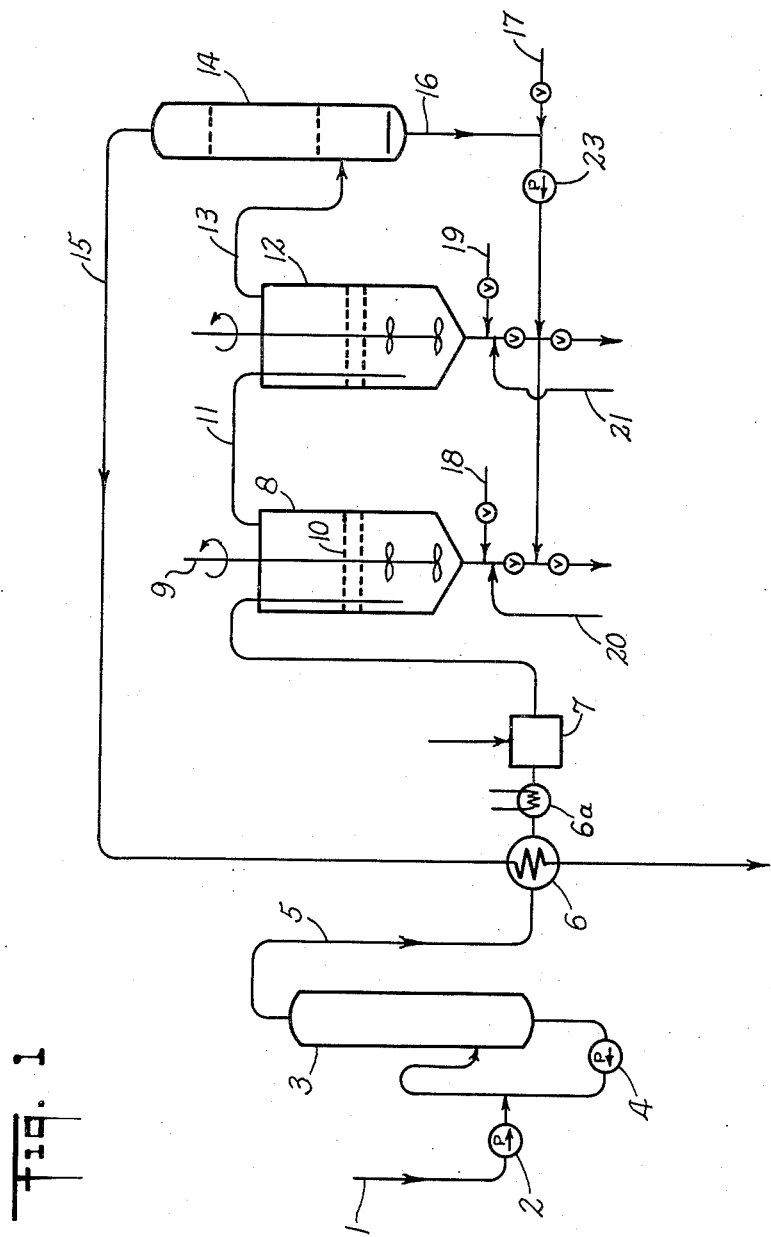

INVENTORS
Edouard Weisang
André Valet
BY
Curtis Morris + Safford
ATTORNEYS

United States Patent Office 3,038,855
Patented June 12, 1962

3,038,855
PROCESS FOR THE OXIDATION OF
MERCAPTANS
Edouard Weisang, Le Havre, and André Valet, Gonfre-
ville-l'Orcher, France, assignors to Compagnie Fran-
çaise de Raffinage, Paris, France
Filed Mar. 19, 1959, Ser. No. 800,454
Claims priority, application France Nov. 15, 1958
7 Claims. (Cl. 208—203)

This invention relates to the "sweetening" of petroleum hydrocarbons by the catalytic oxidation of such substances as mercaptans or mercaptides therein, and, more particularly, to a system for the continuous sweetening treatment of petroleum hydrocarbons with an oxygen-containing gas in the presence of aqueous alkaline solutions and a sulphur dye as an oxidation catalyst.

Methods, generally of the character to which this invention relates, for the catalytic oxidation of mercaptans or mercaptides are indicated in the copending application of Weisang and Gislon, Serial No. 499,498, filed April 5, 1955, now Patent 2,879,140, as including the sweetening of petroleum hydrocarbons or the oxidation of mercaptans therein to disulfides by the action of an oxygen-containing gas in the presence of an aqueous solution of an alkali metal hydroxide containing dispersed therein a small amount of one or another of the so-called sulfur dyes. As will be undertsood, the rates of the chemical reactions involved in such methods may depend, with substantial variations, on such factors as the nature of the mercaptans being oxidized, the petroleum products being treated, etc., and such rates of reaction may, in some cases, be slower than desired for optimum continuous industrial operation. Similarly, the system involved is rather complex in that the reactions are carried out in a heterogeneous medium involving the hydrocarbon phase, containing the mercaptans to be oxidized and the dissolved oxygen-containing gas, as well as an aqueous alkaline phase and a solid dye-suff which is insoluble in both phases. Also, some difficulty, particularly if continuous processing is desired, may be experienced from the progressive accumulation in the system of solid waste materials of exhausted dye and/or adjuvants or other additives to the dye material introduced in the system, and such accumulations may favor the formation of undesirably stable emulsions which may disturb or inhibit the desired settling or settling rates of the treated products.

According to this invention, however, a system is provided for the satisfactorily rapid carrying out of the reactions involved in a continuous fashion or process with enhanced efficiency and including selection and control of the various operating conditions for the particular dye materials being used, as well as correlating particular dye catalyst materials to continuous operation and providing for the regeneration of the aqueous alkaline phase with the elimination of undesired waste accumulations therein. Such being the prinicpal objects of this invention, other objects and advantages will be apparent from the following description, the accompanying drawings, and the appended claims.

In the drawing—

Figure 2:
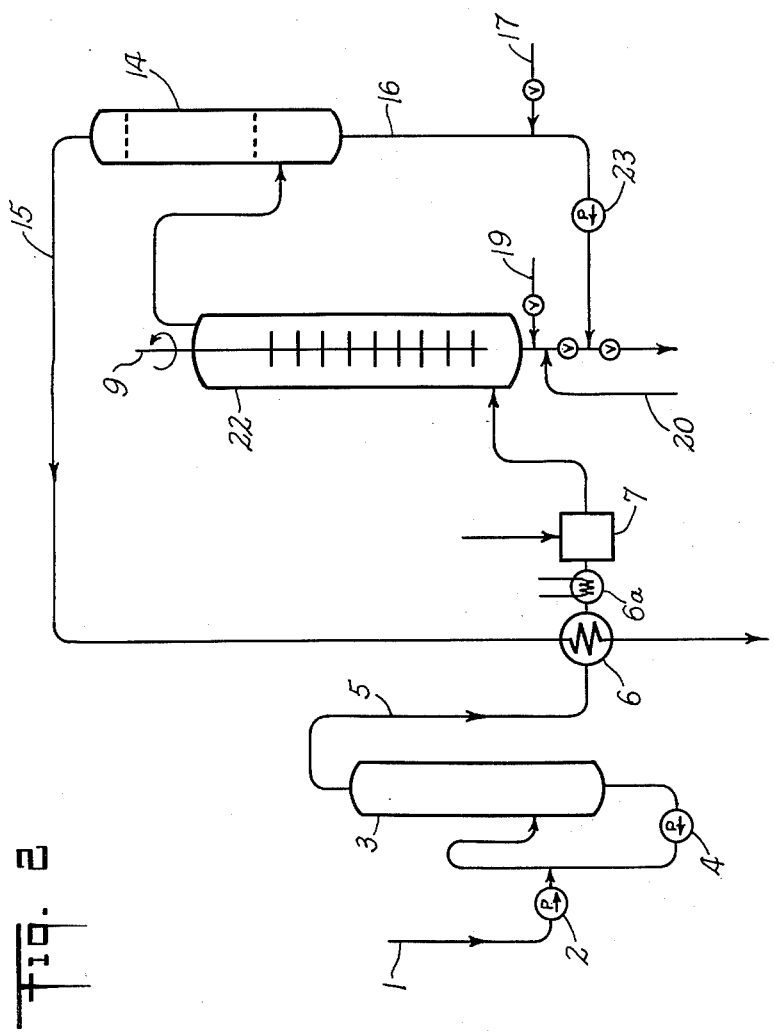

FIG. 1 illustrates in diagrammatic or flow sheet form a series of apparatus and method steps for a system embodying and for practicing this invention including multiple reactor means; and FIG. 2 illustrates in diagrammatic or flow sheet form another series of apparatus and method steps for a system embodying and for practicing this invention including a continuous extraction column instead of the multiple reactors of FIG. 1.

Referring to the drawings, in which like characters of reference refer to like parts throughout the several views thereof, a series of apparatus elements is indicated for conducting the processes of this invention in a continuous manner, although it is to be understood that other types of apparatus or combinations of apparatus are comprehended within this invention and may include, for example, conventional decanting and contacting or reactor means well known in the petroleum industry for utilization in other processes and which need no specific description here.

Referring to the system of FIG. 1, the hydrocarbons to be treated are introduced into the system from inlet pipe 1, by pump 2, which pumps the hydrocarbons into a conventional pre-washing system indicated at 3 as including a recirculating pump 4. Conduit 5 leads the pre-washed hydrocarbons to be heated in a heat exchanger 6 and heater 6a, from which the heated hydrocarbons pass into an aerator 7 to be saturated with air. From aerator 7, the heated and air-containing hydrocarbons are led to a reactor 8 preferably provided with an agitator 9. Reactor 8 is also preferably provided with a layer of packing or metal matting 10 above which the resulting liquid mixture is clarified by decantation before the supernatant liquid layer is drawn off through conduit 11 into a second reactor 12, substantially identical with reactor 8, and, after further reaction and additional decantation, the supernatant layer of reactor 12 is withdrawn through conduit 13 into a settling tank or coalescer 14, from which the supernatant and sweetened hydrocarbon fraction is withdrawn through conduit 15, preferably passing through heat exchanger 6 for the conservation of heat, and on out of the system to the next stage of processing or storage as may be desired.

Entrained reagent from tank 14 is withdrawn through conduit 16 and returned to the bottoms of reactors 8 and 12 as by pump 23 as may be desired, and replenishing alkaline solution is added at 17, into reagent recirculation line 16, and replenishing dye catalyst is introduced into the reagent recirculation line as at 18 and 19. Air or other oxygen-containing gas may also be introduced as at 20 or 21 into the reagent as it enters the reactors, if this be necessary or desired to supplement the air or other gaseous mixture incorporated into the hydrocarbons at the aerator 7. If additional reactor stages are desired, according to the considerations described below, they may satisfactorily be substantialy identical with reactors 8 and 12 and connected therewith in series as will be understood from the foregoing.

Referring to the system indicated in FIG. 2 the various parts and flow lines are generally similar to FIG. 1 except that the series of reactors 8, 12 are supplanted by a single extraction column 22, the size and throughput of which are selected to produce substantially the same reacting results as to contact time, holding time, etc., as are achieved by the multiple reactors of FIG. 1.

Particularly with regard to adapting a system of this character for continuous operation on an industrial or commercial scale, it may be noted, as will be understood, two aspects of the sulfur dye used as a catalyst need primary consideration—i.e., the composition of the dye material and the quantity thereof employed. Whereas virtually all of the so-called "sulfur dyes" may be considered oxidation catalysts to one degree or another, it is preferred in practicing this invention to utilize as such a sulfur dye particular one or ones which give rise to the most rapid rates of reaction under the most economic conditions and with due regard to such ancillary considerations as whatever limitations the flash points or boiling points of the hydrocarbon materials may place on attempting to increase the reaction rate by raising the reaction temperature.

In this connection, it has been discovered, according to this invention, that the sulfur dyes listed in the standard color index as corresponding to number 1002 (e.g., Sulfanol Dark Green B, Katigen Olive G, etc.,) are preferred as having substantially enhanced efficiency and effect in the oxidation of mercaptans as compared with other sulfur dyes listed as either higher or lower index numbers.

As exemplary of the foregoing may be noted the comparative data indicated in the following table. These data result from determinations, conducted at ordinary temperature, in which 50 cc. of a kerosene cut of Iraq origin, containing 26 mg. of sulfur per 100 cc. in the form of mercaptans were treated with 25 cc. of a 45% by weight potash soda solution and 0.05 gram of the different sulfur dyes noted, the comparison among the activities of the various dyes being noted by determining the residual mercaptan content of the treated fractions (the expression "$S_{RSH}$" in the following tables indicating sulfur measured as mercaptan) as a function of the treatment time.

TABLE I

|  | No. of Color Index | Activity of the sulfur dyes expressed in mg. $S_{RSH}$ per 100 cc. residual as a function of time. | | |
| --- | --- | --- | --- | --- |
|  |  | 0 min. | 20 min. | 80 min. |
| Sulfanol Dark Green B | 1002 | 26 | 2.4 | 1.6 |
| Katigen Olive G | 1002 | 26 | 2.1 | 1.2 |
| Cachou Laval | 933 | 26 | 8 | 4.0 |
| Pyrogen Green RL | 956 | 26 | 12 | 8.4 |
| Thionol Bright Green BBS | 1006 | 26 | 15.6 | 10.8 |

As indicative of the variation in results attributable to a variation in the quantity (as opposed to the identity) of the particular sulfur dye used, the following example may be noted, with the comparative data indicated thereby being set forth in Table II.

EXAMPLE 1

A cut of one liter of Middle East kerosene, having an initial point of 181° C. and a final point of 253° C. and a density of 0.796 at 15° C., was found to contain 0.0215% by weight (i.e., 0.170 gram per 1000 cc.) of sulfur in the form of mercaptans. This material was agitated with one liter of aqueous 35% caustic soda in the presence of various quantities of Sulfanol Dark Green B, and the reaction time required to obtain a given amount of reduction in the mercaptan content (or a given amount of residual mercaptans in the treated hydrocarbons) was determined, all the reactions being conducted at a temperature of 23° C. The results are set forth in Table II.

TABLE II

| Test No. | Initial Quantity of $S_{(RSH)}$ grams/ 1,000 cc. | Quantity of technical dye, gms. | Pure dye, gms. | Contact Time, min. | Residual $S_{RSH}$, g./1,000 cc. |
| --- | --- | --- | --- | --- | --- |
| 1 | 0.170 | 0.425 | 0.085 | 10 | 0.034 |
| 2 | 0.170 | 0.170 | 0.034 | 20 | 0.034 |
| 3 | 0.170 | 0.025 | 0.005 | 40 | 0.034 |
| 4 | 0.170 | 0.740 | 0.148 | 10 | 0.017 |
| 5 | 0.170 | 0.380 | 0.076 | 20 | 0 017 |
| 6 | 0.170 | 0.130 | 0.026 | 40 | 0.017 |

The foregoing data indicates that with the particular quantities of the reagent used, complete removal of mercaptans was not obtained oven after 40 minutes' contact time at a temperature of 23° C. In this connection, it has been found according to this invention that an increase in reacting temperature produces an increase in the reaction rate, as demonstrated with respect to the following example.

EXAMPLE 2

A cut of one liter of Middle East kerosene, having a density of 0.796 at 15° C. and containing 0.170 gram sulfur as mercaptan per 1000 cc., was agitated with one liter of 35% aqueous potash solution containing 0.170 gram technical grade Sulfanol Dark Green B. The quantity of residual sulfur as mercaptans ($S_{RSH}$) was determined after 10 to 20 minutes' agitation with the reagents, and the reactions were carried out under substantially identical conditions at temperatures of 0° C., 20° C., and 50° C., with the results being indicated in Table III.

TABLE III

Quantity of $S_{RSH}$ in g. per 1000 cc.

| Time of agitation | Temperature of reaction | | |
| --- | --- | --- | --- |
|  | 0° C. | 20° C. | 50° C. |
| 0 min | 0.170 | 0.170 | 0.170 |
| 10 min | 0.120 | 0.060 | 0.005 |
| 20 min | 0.080 | 0 040 | Doctor Sweet. |

As will be noted from the foregoing, increasing the reaction temperature results in a saving of reagent, in addition to an increased reaction rate—i.e., comparison of the value set forth in Tables II and III indicates that 0.170 gram of dye at 50° C., produces a substantially greater completeness of oxidation of the mercaptans in 10 minutes than as much as 0.740 gram of dye does at 23° C., and yet a further illustration of this aspect of the operating conditions in a system according to this invention is noted below in conection with Example 4. As will be understood, of course, in this connection, there may be a practical limit imposed upon the extent to which the reacting temperature may be increased resulting from such considerations as the flash points or boiling points of the constituents of the hydrocarbon mixture being treated, safety considerations, etc.

As noted above, it is preferred according to this invention to carry out the process continuously with continuous introduction of both the hydrocarbons to be treated and the alkaline aqueous phase reagent (including the dye catalyst) into a reaction zone for agitation and contact therein with, of course, an oxygen-containing gas, such as air, either separately introduced or introduced as admixed with the hydrocarbons, or both if the hydrocarbons themselves are of such character as not to dissolve or entrain a sufficient quantity of oxygen for the complete oxidation of mercaptans therein. Also as noted in the foregoing, it is preferred to repeat the reaction contact period a plurality of times (or in a plurality of stages) for optimum effect, either in separate reactors (such as 8 or 12) or in a single column having a plurality of stages or levels producible therein (such as 22), depending upon, of course, the degree of refining or sweetening which it is desired to obtain. Generally, the ratio of the aqueous reagent and the hydrocarbon phase volumes is satisfactorily maintained at about 1–1, but satisfactory results are achieved by varying this ratio over wide ranges.

The number of reactors (such as 8 or 12) or the number of reaction stages obtainable in a continuous extraction column (such as 22) need not, in the usual case, be particularly high in systems according to this invention. Generally satisfactory results are obtained with from 1 to 5 reaction stages and, preferably, 2 or 3. In this connection it may be noted that, if the participation of each stage or the proportionate contribution thereof to sulfur oxidation is indicated by the ratio $r$ of the concentration $U_{n-1}$ of the mercaptans in the hydrocarbon mixture coming from the preceding stage ($n-1$) and entering the stage $n$, and if the concentration of mercaptans at the outlet of stage $n$ is indicated by $U_n$, then the relationship $$r = \frac{U_{n-1}}{U_n}$$

obtains, and it is noted that the quantity of treated product varies as a function of the number of reactors, geometrically at the rate of $1/r$. Satisfactory results are obtained according to this invention with the ratio $r$ as above noted substantially constant, and the operating conditions are so regulated to this effect, with satisfactory results being obtained with this ratio between 1 and 10 and, preferably, between 2 and 5 throughout the various reaction stages of the system. It will be observed, however, that the value of $r$ may decrease slightly as the final reaction stages are approached where the most resistant mercaptans are oxidized—e.g., in Example 3, below, this ratio was found to be approximately 3.5 as between the untreated hydrocarbons and the first stage, but decreased to about 3.0 as between stage 1 and stage 2.

Also, particularly when the process is operated in a continuous fashion, there may be noted a gradual lowering of the catalytic activity of the dye material resulting, perhaps, from various mechanical or chemical reasons such as, for example, mechanical entrainment in the material being refined, degradation of the dye substance by oxidation to which it may be particularly sensitive in an alkaline medium, and the like. Accordingly, small replenishing quantities of fresh dyestuff catalyst are added to the system from time to time (or, preferably, continuously), satisfactorily, as noted above, at 18 or 19, in the solid state directly into the reactor, or in the form of a paste or a concentrated dispersion in water, either alone or in an aliquot share of the aqueous alkaline solution present or, if desired, as an aqueous solution of the leuco derivative of the dyestuff.

As illustrative of this further control feature in accordance with this invention, the operations and data may be noted in connection with the following example:

EXAMPLE 3

A two-stage apparatus consisting of two identical vats, each containing 36 liters of an aqueous 35% potash solution and 100 grams of technical grade Sulfanol Dark Green B was utilized. A stream of Middle East kerosene, pre-washed with potash, was treated at 20° C. so that the refined product emerging from the second stage contained 0.07 gram per liter mercaptan sulfur and were saturated with oxygen. Such flow or throughput corresponded to 3.1 volumes per hour of material being treated per volume of aqueous reagent phase (v./h./v.). To accommodate this rate of flow and degree of result, 3.9 grams of technical Sulfanol Dark Green B was added per hour per stage, thus establishing an equilibrium which maintained the activity of the reagents substantially constant and enabled the treatment of 3000 volumes of kerosene per volume of aqueous reagent bath, as noted in Table IV.

TABLE IV

| Hourly addition of dye in gms./hr. | | Mercaptan sulfur, gms. per liter | | | Flow in v./h./v. |
|---|---|---|---|---|---|
| Per reactor | Total | Pre-washed charge | 1st stage | 2nd stage | |
| | | $u_0$ | $u_1$ | $u_2$ | |
| 3.9 | 7.8 | 0.088 | 0.023 | 0.0075 | 3.1 |
| 5.4 | 10.8 | 0.080 | 0.025 | 0.0075 | 4.2 |
| 8.5 | 17 | 0.080 | 0.020 | 0.008 | 6.25 |

Accordingly, it is possible to accommodate a substantially increased flow or throughput of material by increasing the rate of addition of the dye catalyst and without making any substantial change in the mercaptan removal, etc., in the apparatus, with such increase in throughput being substantially proportional to the increase in dye addition, as will be apparent from the data in Table IV. Thus in this example the consumption of technical grade dye was 70 to 75 grams per cubic meter of refined product.

Furthermore, from the data previously noted in connection with Table III, increasing the temperature of reaction, as may be practicable for a particular hydrocarbon mixture, enables either decreasing the rate of introduction of catalyst or increasing the rate of throughput flow of the hydrocarbons (or both to a correlated extent), yet without changing the specifications or degree of oxidation of mercaptans or the quantity of residual mercaptans in the finished product. As further illustrative of this control feature may be noted the following Example 4.

EXAMPLE 4

Using the same apparatus as in Example 3 for treating the same hydrocarbon fraction of kerosene, operation was carried out first at 20° C. and then later at 40° C. without changing the rate of throughput flow. With such increase in temperature, the consumption of Sulfanol Dark Green B decreased from 17 to 11 grams per hour without indicating any substantial change in the quality of the products or the residual mercaptan sulfur therein. Alternatively when the rate of addition of dye was maintained constant, such increase in temperature produced an increased yield where the efficiency amounted to about 8.5 v./v./h. (volumes product treated per volume of reagent per hour), such data being indicated in Table V.

TABLE V

| Temperature | Rate of flow, v./h./v. | Mercaptan sulfur concentration in grams per liter | | | Dye addition (g./hr.) | |
|---|---|---|---|---|---|---|
| | | $u_0$ | $u_1$ | $u_2$ | per reactor | Total |
| 20° | 6.25 | 0.070 | 0.020 | 0.008 | 8.5 | 17 |
| 40° | 6.25 | 0.075 | 0.019 | 0.0075 | 5.6 | 11.2 |
| 40° | 8.5 | 0.075 | 0.020 | 0.008 | 8.5 | 17 |

As illustrative of the satisfactory operation of an installation comprising an agitated liquid extraction column as in FIG. 2, instead of the multiple reactors of Example 4, the following example may be noted:

EXAMPLE 5

A Middle East straight run gasoline fraction of an initial boiling point of 55° C. and an end point of 155° C. was treated in an installation comprising a liquid extraction column with mechanical agitation therein. The mercaptan content of the original gasoline fraction had been previously reduced to 80 grams per cubic meter by another method of treatment, and the starting material here treated had been saturated with oxygen. The continuous treatment apparatus contained 25 liters of 35% aqueous potash solution and 70 grams of Sulfanol Dark Green B, and the gasoline was fed thereinto at the rate of 16 v./v./h. (400 liters per hour) and at a temperature of 40° C., while 9 grams per hour of technical grade dye was introduced (Sulfanol Dark Green B and Katigen Olive G at various times). The gasoline emerged in commercially satisfactory condition or stage of mercaptan content indicated by the conventional designation "doctor sweet."

Alternatively, when this installation was operated at 20° C., the gasoline did not emerge doctor sweet, the other conditions being the same, unless the rate of throughput flow of gasoline was reduced by about half. Furthermore, when operating at 40° C., a gradual increasing of the dye addition to 15 and then 20 grams per hour enabled the rate flow of gasoline to be increased, respectively, to 24 v./h./v. (600 liters per hour) and 32 v./h./v. (800 liters per hour) while still obtaining a "doctor sweet" gasoline product emerging from the apparatus. In the foregoing runs, the consumption of dye, based upon the refined finished product, was 24 to 25 grams of technical grade dye per cubic meter of product.

As will be understood, the time efficiency or reaction rate of the continuous process is a function of, among other things, the intimacy of contact of the aqueous and hydrocarbon phases in the apparatus, as influenced by, for example, the degree of intensity of mechanical or other agitation thereof, as is illustrated by the following example:

EXAMPLE 6

Using the apparatus and ingredients referred to in Example 4 above, the speed of rotation of the agitators 9 in reacting vessels 8 and 12 was increased from 1120 r.p.m. to 1470 r.p.m., the other conditions with respect to the temperature and rates of throughput flow remaining unchanged, and the data resulting therefrom is set forth in Table VI.

TABLE VI

| Temperature | Agitation in r.p.m. | V./h./v. | Mercaptan sulfur concentration (grams/liter) | | | Dye Addition Per Reactor | (g./hr.) For both reactors |
|---|---|---|---|---|---|---|---|
| | | | $u_0$ | $u_1$ | $u_2$ | | |
| 20° | 1,120 | 6.25 | 0.070 | 0.020 | 0.008 | 8.5 | 17 |
| 20° | 1,470 | 6.25 | 0.070 | 0.020 | 0.0075 | 6.75 | 13.5 |
| 20° | 1,470 | 8.5 | 0.070 | 0.020 | 0.0075 | 8.5 | 17 |

As will be noted, the dye consumption necessary to accomplish the desired degree of mercaptan oxidation dropped from 17 grams to 13.5 grams per hour with such increase in speed of the agitators in the reacting stages. Alternatively, when the dye addition was maintained at 17 grams per hour, the throughput rate of flow was satisfactorily increased to 8.5 v./h./v. with equivalent mercaptan removal.

As is well understood, gasoline containing a substantial olefine fraction may require the addition thereto of inhibitor substances to maintain the desired stability thereof. Such olefine gasolines, treated in accordance with the present invention, have been found to show excellent stability and are satisfactorily produced with substantially decreased quantities of inhibitor as compared with others customarily required. Some illustrative data in this connection are set forth in the following Table VII.

TABLE VII

| Inhibitor gm./m.³ | Induction Period (minutes) | | | |
|---|---|---|---|---|
| | 20 | 30 | 40 | 60 |
| Catalytic light gasoline: | | | | |
| plumbite refined | 205 | | 545 | 645 |
| Sulfanol Dark Green B refined | 335 | | 645 | 660 |
| Light thermal cracking gasoline: | | | | |
| pre-washed NaOH | | 119 | | 305 |
| refined with plumbite | | 182 | | 305 |
| refined with Sulfanol Dark Green B | | 81 | | 330 |
| refined with copper | | 101 | | |
| Straight-run gasoline+reforming gasoline: | | | | |
| pre-washed | | 75 | | |
| refined with copper+10 mg./liter DMD | | 163 | | |
| refined with copper+30 mg./liter DMD | | 238 | | |
| refined with Sulfanol Dark Green B | | 313 | | |

It should furthermore be noted that the refining or sweetening in accordance with the present invention does not result in the formation of peroxides. Actually, the addition of an inhibitor (and, in particular, an inhibitor of the paraphenylene-diamine type) does not prevent the desired catalytic action of the sulfur dyes, and this invention has satisfactorily been applied to gasolines which have been previously inhibited, as illustrated by Example 7.

EXAMPLE 7

Into a two-stage apparatus, such as illustrated in FIG. 1 and consisting of two identical tanks each containing 50 liters of an aqueous 35% solution of potash, there was continuously introduced, at 40° C., 2500 liters per hour of a mixture of cracking gasoline and reforming gasoline containing 0.010% sulfur in the form of mercaptans. This gasoline had been previously washed with a caustic soda solution to remove hydrogen sulfide and had been stabilized by the addition of an inhibitor of the conventional type known in the industry such as, for example, 30 grams per cubic meter of di-NN'-secondary-butyl-paraphenylene-diamine. Into each stage of the apparatus, there was introduced along with the gasoline 35 grams per hour of technical grade Sulfanol Dark Green B. After such treatment, the gasoline emerged "sweet" from the treatment unit. It should also be noted, for completeness, that the particular inhibitor in question here may also be known as an oxidation catalyst of mercaptans, but it did not itself give a sweetening effect to this particular gasoline fraction, even after 24 hours of contact.

As previously noted, and particularly with continuous operation, the aqueous reactant phase to which the dye catalyst is added, may progressively accumulate more and more solid waste products of the dyes and adjuvants of the technical grade product, etc., which may produce or favor the formation of undesirably stable emulsions interfering with the desired settling of the treated products during decantation periods. Furthermore, frequent complete renewal of the reagent phase may be undesirable, from an economic standpoint, because of an unnecessary waste thereby of the alkaline ingredient.

According to this invention, however, provision is made for obviating such disadvantage and prolonging the time of use of the aqueous reagent by regenerating it with the removal therefrom of undesirably accumulating dye waste or other solid products. For example, satisfactory results are achieved in such regeneration by filtering the aqueous reactant to remove solid particles therefrom, satisfactorily as it is separated from the supernatant hydrocarbon phase. As will be understood, the frequency of such filtrations vary, depending on the nature of the materials being treated and the rates of addition of the dye substances, but satisfactory results are achieved in the operation of this invention if the aqueous phase is filtered after having treated from 1000 to 3000, and preferably no more than 2000, times its volume of hydrocarbons. Also, according to this invention, centrifuging the aqueous reagent for the removal therefrom of solid particles also achieves satisfactory results, as does the admixture therein of inert absorbent material or agglomerates before filtration or centrifuging in order to facilitate the latter operations. Although a wide variety of filter materials compatible with a concentrated alkaline solution produce satisfactory results, as will be understood, a triple bed of finely screened sawdust is preferred, with the three layers or beds being made up, respectively, of sawdust having an AFNOR size modulus of 27, then 23, and finally 27, and with the sawdust being previously washed with a dilute 5% solution of potash near its boiling point in order to remove or digest out the soluble or solubilizable substances of wood.

While this invention has been described and exemplified in terms of its preferred embodiments, those skilled in the art will appreciate that modifications can be made without departing from the scope of the invention as defined in the appended claims.

We claim:

1. In a method of sweetening petroleum hydrocarbon products for the oxidation of mercaptans therein by an oxygen-containing gas in the presence of an aqueous alkaline phase including an oxygenation catalyst, the steps which comprise reacting said petroleum hydrocarbon with oxygen-containing gas in the presence of an aqueous alkaline phase containing an oxygenation catalyst in a first stage of reaction effecting partial sweetening of said petroleum hydrocarbons, thereafter reacting said partially sweetened petroleum hydrocarbon with an oxygen-containing gas in the presence of an aqueous alkaline phase including an oxygenation catalyst in a second stage for further sweetening said partially sweetened petroleum hydrocarbons, said oxygenation catalyst in all said stages of reaction being a sulfur dye having a color index number of 1002, and the temperature of reaction in said stages being approximately within the range of 35° to 80° C.

2. In a method of sweetening petroleum hydrocarbon products for the oxidation of mercaptans therein by an oxygen-containing gas in the presence of an aqueous alkaline phase including an oxygenation catalyst, the steps which comprise reacting said petroleum hydrocarbon with oxygen-containing gas in the presence of an aqueous alkaline phase containing an oxygenation catalyst in a first stage of reaction effecting partial sweetening of said petroleum hydrocarbons, thereafter reacting said partially sweetened petroleum hydrocarbon with an oxygen-containing gas in the presence of an aqueous alkaline phase including an oxygenation catalyst in a second stage for further sweetening said partially sweetened petroleum hydrocarbons, at least a substantial portion of said aqueous alkaline phase of said second stage not having been present for reaction in said first stage, said oxygenation catalyst in all said stages of reaction being a sulfur dye having a color index number of 1002.

3. A method as recited in claim 2 which includes subjecting treated petroleum hydrocarbons from said second stage of reaction to a third stage of reaction in which said hydrocarbons are reacted with an additional quantity of oxygen-containing gas in the presence of an aqueous alkaline phase including an oxygenation catalyst not present during said first and said second stages of reaction for further sweetening said petroleum hydrocarbons.

4. A method as recited in claim 2 in which the ratio of concentration of mercaptans in said petroleum hydrocarbons entering each said stage of reaction to the concentration of mercaptans in said petroleum hydrocarbons leaving each said stage of reaction is within the range of about 2–5.

5. A method as recited in claim 2 in which said reactions in said stages of said process are continuously carried out with continuous introduction and withdrawal of said petroleum hydrocarbons.

6. In the continuous petroleum hydrocarbon sweetening according to claim 5, the steps which comprise withdrawing from said continuous process said aqueous phase including by-product resultants of said catalytic oxidation reactions, separating from said withdrawn aqueous phase said by-product reactants for the regeneration of said aqueous phase, and recycling said regenerated aqueous phase through said process.

7. In the continuous process according to claim 6, the steps which comprise adding fresh oxidation catalyst and fresh alkali admixed with said regenerated aqueous phase for continuous replenished sweetening reaction in said reaction stages of said process.

References Cited in the file of this patent

UNITED STATES PATENTS

| | | |
|---|---|---|
| 2,739,101 | Gordon et al. | Mar. 20, 1956 |
| 2,897,140 | Gislon et al. | July 28, 1959 |